United States Patent [19]

Takeshima et al.

[11] Patent Number: 4,733,024
[45] Date of Patent: Mar. 22, 1988

[54] KEY SWITCH

[75] Inventors: Masaji Takeshima; Kiyoshi Kinugawa, both of Nara, Japan

[73] Assignee: Sharp Kabushiki Kaisha, Osaka, Japan

[21] Appl. No.: 924,337

[22] Filed: Oct. 29, 1986

[30] Foreign Application Priority Data

Nov. 7, 1985 [JP] Japan .............. 60-171680[U]

[51] Int. Cl.⁴ .............................. H01H 19/04
[52] U.S. Cl. .................... 200/6 R; 200/5 A; 200/159 B
[58] Field of Search ............ 200/5 A, 159 B, 6 A, 200/6 R

[56] References Cited

U.S. PATENT DOCUMENTS 4,029,915  6/1977  Ojima ................... 200/5 A
4,687,200  8/1987  Shirai ................. 200/5 A X

FOREIGN PATENT DOCUMENTS 3328612  8/1983  Fed. Rep. of Germany .

Primary Examiner—A. D. Pellinen
Assistant Examiner—Morris Ginsburg
Attorney, Agent, or Firm—Birch, Stewart, Kolasch & Birch

[57] ABSTRACT

A key switch is provided with a depressable part having a contact set in its underside and held apart from a stationary contact located below it. The depressable part has a key switch surface located to one side of the center on the upper surface of the depressable part. The key switch is also provided with a rotation fulcrum in the center of the underside of the depressable part. The movable contact is located to one side of the center on the underside of the depressable part to allow the depressable part to turn on the fulcrum so that the movable and stationary contacts can touch each other.

7 Claims, 10 Drawing Figures

FIG. 1
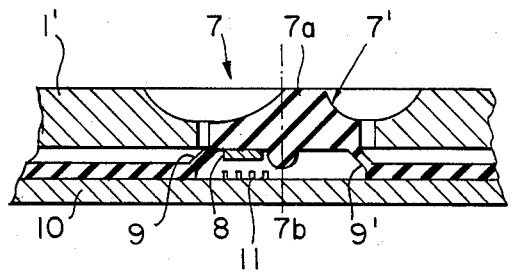
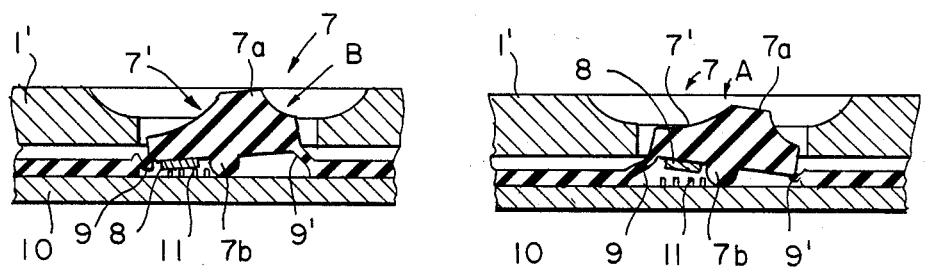
FIG. 2  FIG. 3

FIG. 6
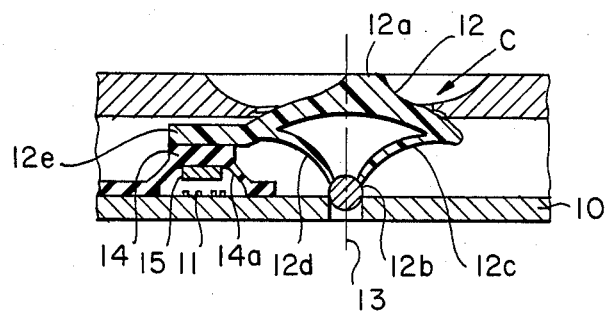
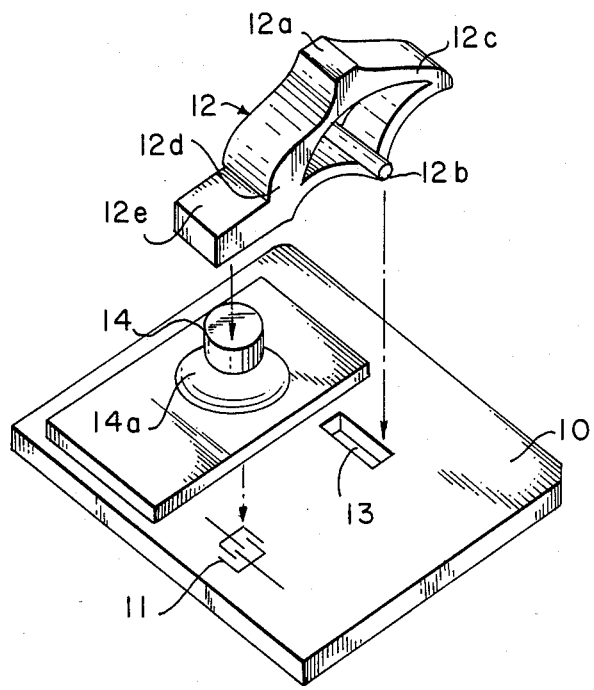
FIG. 7

KEY SWITCH

BACKGROUND OF THE INVENTION

The present invention relates to a press-on key switch to be used as the power switch of a compact electronic device such as an electronic clinical thermometer or electronic calculator.

When pressure is applied on the top surface of the key switch device, the movable contact touches the stationary one, and it disconnects when the pressure is released.

FIG. 8 shows a conventional electronic clinical thermometer. A temperature sensor 2, a digital temperature display 3, and a battery storage housing 4 are located at the tip, center, and the rear positions, respectively. A key switch 5 serving as the power switch is provided between the digital display 3 and the battery storage housing 4. As shown by the sectional view of FIG. 9, the key switch surface 5a, on which pressure is applied to activate the key switch 5, is almost flush with the upper surface of a thermometer case 1 due to a rubber spring or flexible part 5b. Whenever the key switch surface 5a is pressed, a movable contact 5c touches a stationary contact 6a on a printed circuit board 6 installed below the movable contact 5c, to alternately turn the power supply on and off. However, since the key switch 5 is activated merely by the depression of the key switch surface 5a, if an operator accidentally presses it sufficiently to turn the power supply off after taking his or her own temperature, the temperature display will be erased. Conversely, an operator may accidentally turn on the power while storing the clinical thermometer in its case and thus, waste the batteries.

SUMMARY OF THE INVENTION

The primary object of the present invention is to provide a novel key switch which cannot be turned on and off should the operator accidentally press the key switch surface, but which can only be intentionally activated when depressed by the operator.

Other objects and further scope of applicability of the present invention will become apparent from the detailed description given hereinafter. It should be understood, however, that the detailed description and specific example, while indicating preferred embodiments of the invention, are given by way of illustration only, since various changes and modifications within the spirit and scope of the invention will become apparent to those skilled in the art from the following detailed description.

To achieve these objectives, the invention offers a novel key switch with a depressable part having a contact set in its underside and held apart from a stationary contact located below it. The depressable part has a key switch located to one side of the center on the upper surface of the depressable part. The key switch is also provided with a rotation fulcrum in the center of the underside of the depressable part. The movable contact is located to one side of center on the underside of the depressable part to allow the depressable part to turn on the fulcrum so that the movable and stationary contacts can touch each other. With this configuration, when the operator accidentally pushes the depressable part, the movable contact rotates in one direction on the fulcrum, inhibiting contact between the movable and stationary contacts. It is only when the key switch surface is pressed in a specific direction, rotating the depressable part in a certain direction, that both contacts can touch each other to turn the switch on or off. In summary, since the key switch can be turned on or off only when a depressing force is applied in a specific direction, the operator cannot accidentally turn the switch on or off with a careless push.

BRIEF DESCRIPTION OF THE DRAWINGS

The present invention will be better understood from the following detailed description and the accompanying drawings which are given by way of illustration only, and thus, are not limitative of the present invention, in which:

FIG. 1 is a schematic sectional view of the present invention of the key switch when it is not depressed;

FIG. 2 is a schematic sectional view of the present invention of the key switch when it is depressed normally to activate operation;

FIG. 3 is a schematic sectional view of the present invention of the key switch when it is operated incorrectly;

FIGS. 6 and 7 are, respectively, sectional and exploded perspective views of another preferred embodiment of the key switch of the present invention;

DESCRIPTION OF THE PREFERRED EMBODIMENTS

Figure 4:
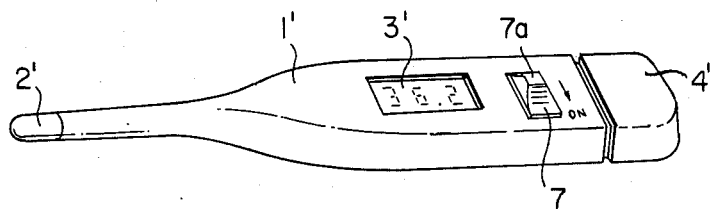
FIG. 4 is a perspective view of an electronic clinical thermometer incorporating the key switch of the present invention.

Referring in detail to the drawings and with particular reference to FIG. 4, a perspective view of an electronic clinical thermometer incorporating the key switch of one of the preferred embodiments of the present invention is shown. A temperature sensor 2', a digital temperature display 3', and a battery storage housing 4' are located at the tip-end, center, and the rear positions of the thermometer, respectively. A key switch 7 functioning as the power switch is located between the digital temperature display 3' and the battery storage housing 4'. An integrated circuit (IC) used to measure body temperature is stored in a main body 1'.

Referring to the accompanying drawings, the preferred embodiment is described in detail below. FIGS. 1 through 3 are sectional views denoting one of the preferred embodiments of the key switch of the present invention. Both sides of a key switch surface, on the upper surface of a depressable part (key top member), have identations. Note that these indentations are made by forming recesses in both the thermometer case 1' and the key switch 7 shown in FIG. 1. Almost flush with the upper surface of the thermometer case 1, a key switch surface 7a is located. This surface 7a is just to the right of center, which is marked by the vertical broken line in FIG. 1. A rotation fulcrum 7b made of insulating material protrudes from the underside of the depressable part 7'. A movable contact 8 is located to the left of center on the underside of the depressable part 7'. Contact 8 does not protrude downward as far as the fulcrum 7b.

The depressable part 7' is supported by either flexible, thin, hollow truncated pyramidal rubber springs or flexible parts 9, 9'. These parts 9, 9' are an integral component of the depressable part 7'. Normally, the movable contact 8 remains apart from a stationary contact 11 provided on a printed circuit board 10. Indentations on both sides of the depressable part 7' may be made by forming curved recesses. The operation of the key switch is as follows.

When the key switch surface 7a is pressed in the arrowed direction A as shown in FIG. 3, the flexible parts 9 and 9' bend to allow the fulcrum 7b to come into contact with the printed circuit board 10. This prevents the movable contact 8 from touching the stationary contact 11. When the key switch surface 7a is pressed further in the arrowed direction A, because the key switch surface 7a is located to one side of center, the depressable part 7' bends the flexible parts 9 and 9' and rotates on the fulcrum 7b. During such movement the movable contact 8 and the stationary contact 11 are unable to touch. In other words, when the operator accidentally pushes on the key switch surface 7a, the key switch will not activate.

For the movable and stationary contacts 8 and 11 to touch, the key switch surface 7a must be pressed at a specific angle, in the downward, inclined direction shown by arrow B in FIG. 2. The depressable part 7' then bends the flexible parts 9 and 9' and rotates slightly on the fulcrum 7b to allow the contacts 8 and 11 to touch. Since the key switch of the present invention is turned on or off as if it were executed by a combination of a slide switch and a push switch, the key switch is protected against accidental activation. When using this device in an electronic clinical thermometer like that shown in FIG. 4, the direction in which the key switch surface 7a is to be pushed should be indicated nearby. Except for the flexible parts 9 ad 9', the depressable part 7' may be made from a solid material.

Figure 5:
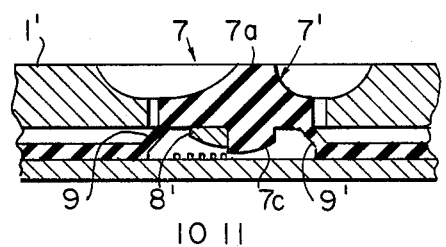
FIG. 5 is a sectional view of another preferred embodiment of the key switch of the present invention.
Figure 8:
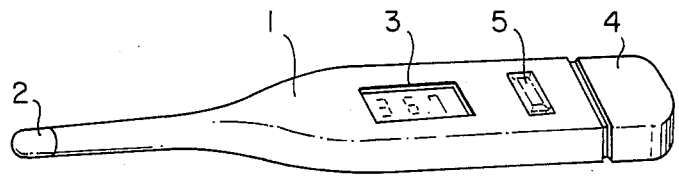
FIG. 8 is a perspective view of an electronic clinical thermometer incorporating a conventional key switch.
Figure 9:
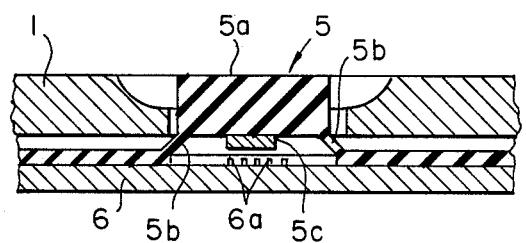
FIG. 9 is a sectional view of a conventional key switch.

FIG. 5 is the sectional view of another preferred embodiment of the key switch of the present invention, in which members identical to those of FIGS. 1 through 3 have the same reference numerals. The fulcrum 7c and movable contact 8' are combined, forming a single protrusion in which the bottom of the fulcrum 7c is closer to the printed circuit board 10 than the bottom of the movable contact 8'.

FIGS. 6 and 7 are respectively the sectional and perspective views of another preferred embodiment of the key switch of the present invention, in which a depressable part 12 is made of a single molded plastic piece. A key switch surface 12a of the depressable part 12 is located to one side of center, indicated by the broken line of FIG. 6. Flexible parts 12c and 12d extend from both sides of a shaft 12b in the upward direction, such that the entire unit forms a rough triangle. The shaft 12b is inserted into a supporting hole 13 of the printed circuit board 10 so that the shaft 12b can move freely. In addition, there is a lever piece 12e that extends to and is mounted on a key switch 14. Normally, the lever piece 12e rests on the rubber switch 14, because the lever piece 12e shifts the center of gravity of the depressable part 12.

A flexible part 14a of the rubber switch 14 keeps the movable contact 15 apart from the stationary contact 11. When the key switch surface 12a is depressed in a vertical direction, flexible parts 12c and 12d bend, causing the depressable part 12 to incline to one side, so that the rubber switch 14 cannot be depressed. The rubber switch 14 can be depressed only by pressing the key switch surface 12a in the direction of the arrow c. This will bend the flexible parts 12c and 12d so that the lever piece 12e moves downward, pivoting on the shaft 12b.

Figure 10:
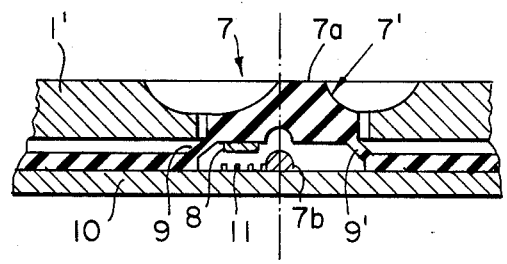
FIG. 10 is a sectional view of another preferred embodiment of the key switch of the present invention.

It should be understood that the present invention is not limitative of those preferred embodiments described above. For example, it is also possible for the present invention to have a printed circuit board 10 with a protrusion acting as a fulcrum and to have a depressable part 7' with an indentation. FIG. 10 is the sectional view of another embodiment of the present invention.

The protrusion 7b is not always limited to insulative material: the use of conductive material does not create any critical problems.

As is clear from the foregoing description of the preferred embodiments, the key switch does not function if its depressable part is merely pressed downwardly. It operates the instrument only when pushed in an inclined direction. As a result, if the operator accidentally presses the key switch, it will not be activated. The key switch embodied by the present invention is especially advantageous in its application to an electronic clinical thermometer, in order to avoid the loss of the display of body temperature by operator accidentally activating the key switch immediately after temperature measurement. In addition, by using the key switch embodied by the present invention as a power switch in various compact electronic devices, such as an electronic calculator, an electronic memorandum, or a pocket computer, accidental activation of the power switch after use can be effectually avoided. This avoids wasting the batteries.

It is also possible to provide several key switches of the present invention in one location. While only certain embodiments of the present invention have been described, it will be apparent to those skilled in the art that various changes and modifications may be made therein without departing from the spirit and scope of the present invention as claimed.

What is claimed is:
1. A key switch comprising;
a depressable element;
a key switch surface positioned to only one, first side of center on an upper surface of said depressable element, said key switch surface having at least a generally flat top portion;
a flexible element allowing said depressable element to move vertically at least when a force substantially perpendicular to said flat top portion is applied to said key switch surface;
rotation fulcrum means for permitting said depressable element to move in a predetermined direction when a second force which is nonperpendicular to said flat top portion is applied to said key switch surface;
movable contact means positioned to another, second side of center on an underside of said depressable element, said first and second sides being on opposite sides of center of said depressable element; and
stationary contact means adapted to touch said movable contact means when said depressable element rotates on said fulcrum means in the predetermined direction when said second force is applied to said key switch surface of said depressable element.
2. The key switch in accordance with claim 1, wherein said movable contact means and fulcrum means are both provided on the underside of said depressable element.

3. The key switch in accordance with claim 1, wherein when said key switch surface is pressed in a vertical direction, said depressable element rotates on said fulcrum means in a direction that prevents said movable and stationary contact means from touching.

4. The key switch in accordance with claim 3, wherein when the key switch surface is pressed at a specified angle in a direction different than said vertical direction, said movable contact means and said stationary contact means touch each other.

5. The key switch in accordance with claim 1, wherein said stationary contact means is provided on a printed circuit board, whereas said fulcrum means is made up of a protrusion on said printed circuit board and an indentation on the underside of said depressable element.

6. The key switch in accordance with claim 1, wherein said stationary contact means is provided on a printed circuit board, whereas said movable contact means is located on a second depressable element of a key switch means.

7. The key switch in accordance with claim 6, including a depression plate and a second key switch surface on said key switch means, said depression plate being capable of depressing said second key switch surface in order to cause engagement of said stationary contact means and said movable contact means.

* * * * *